United States Patent [19]
Lindblad

[11] 3,915,473
[45] Oct. 28, 1975

[54] SAFETY BELT FOR VEHICLES

[76] Inventor: Oskar Lennart Lindblad, Hedasgatan 16, 440 20 Vargarda, Sweden

[22] Filed: Dec. 4, 1972

[21] Appl. No.: 312,112

[30] Foreign Application Priority Data
Dec. 10, 1971 Sweden.............................. 15860/71

[52] U.S. Cl.......................................... 280/150 SB
[51] Int. Cl.² ........................................ B60R 21/02
[58] Field of Search .............. 280/150 SB; 180/82 C

[56] References Cited
UNITED STATES PATENTS

| | | | |
|---|---|---|---|
| 3,022,089 | 2/1962 | Botar............................ | 280/150 SB |
| 3,770,078 | 11/1973 | Keppel...................... | 280/150 SB X |
| 3,815,934 | 6/1974 | Westrate........................ | 280/150 SB |
| 3,827,714 | 8/1974 | Lefeuvre........................ | 280/150 SB |

Primary Examiner—David Schonberg
Assistant Examiner—Michael J. Forman
Attorney, Agent, or Firm—Ulle C. Linton

[57] ABSTRACT

A safety belt for vehicles which belt is of the Y-type and has a portion with one end connected to a wind-up roll on the inner side of a seat of the vehicle and two other belt portions whose ends are fastened to the top and bottom of the vehicle door next to the outer side of the seat, a deflection device having said belt extending therethrough, a wire attached to said deflection device and a reversible motor mounted in front of said seat and means tending to draw said wire towards said door for keeping the wire close to the person on the seat and to the door when door is closed and when the door is opened said motor takes up the wire thereto and pulls said two belt portions alongside said door and the first belt portion is unwound from said roll until the door is closed and the belt and wire return to their original positions.

4 Claims, 3 Drawing Figures

SAFETY BELT FOR VEHICLES

The present invention relates to a safety belt for vehicles and when the safety belt is in use it has at least one band part laid over a person seated on the vehicle seat in question, which band part is subjected to a yielding force operating in its shortening direction, said band part being arranged when in use and when not in use to extend from a point at the sidewall towards the back of the vehicle to a corresponding point at the other side of the person in question via a deflecting means transportable along the vehicle, through which means said band part is thread. The invention is substantially characterized by the deflection means being performed by a wire or similar serving the purpose of pulling means and extending from said deflection means in forwards direction, which pulling means can be reversibly fed in and out respectively in the respective from a collection means.

Figure 1:
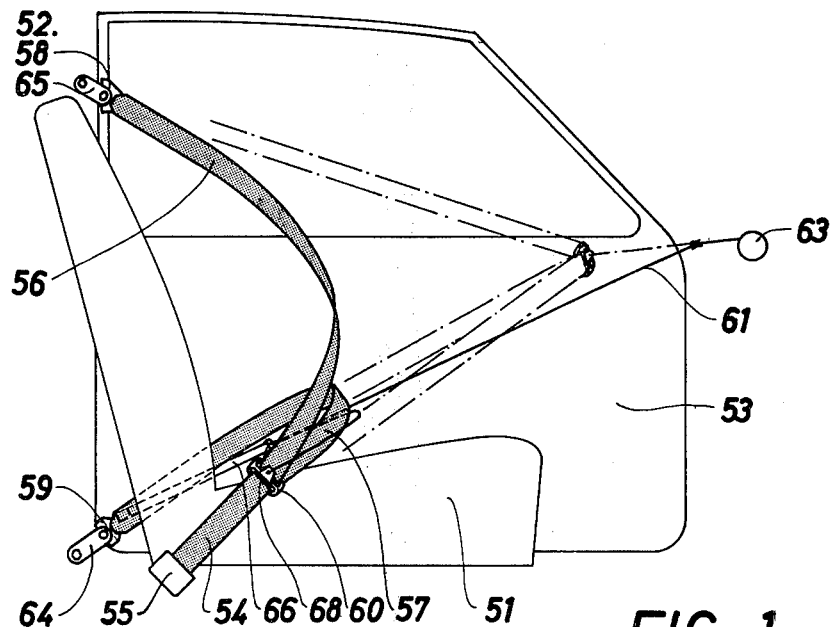
Figure 2:
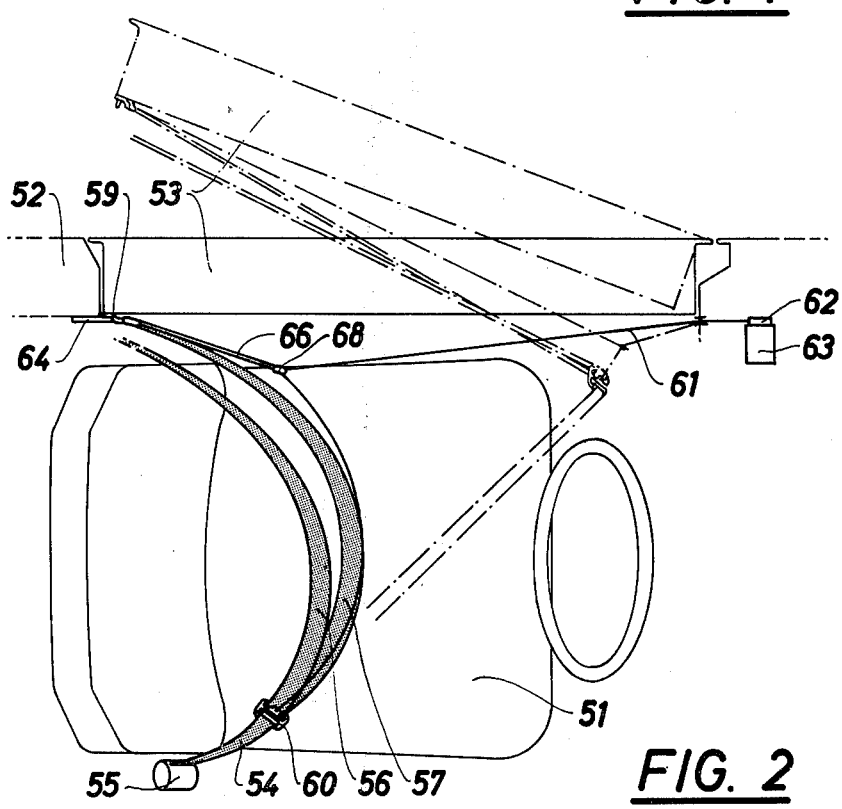
Figure 3:
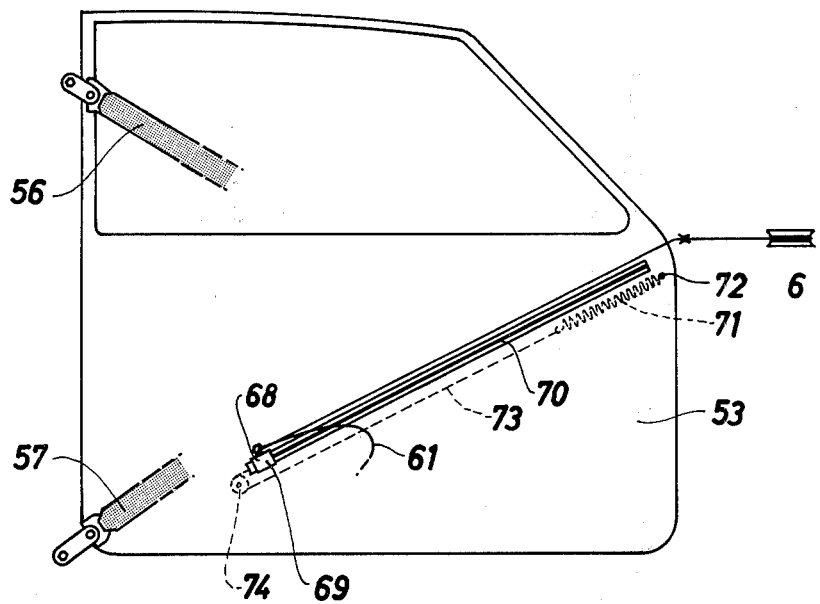

The invention will now be described more in detail with reference to the accompanying drawings, in which FIG. 1 is a side elevational view of a vehicle seat provided with a safety belt according to the invention as seen from the inside of the vehicle, FIG. 2 is a top view of the same vehicle seat, and FIG. 3 is a view corresponding the one in FIG. 1 illustrating certain details of a safety belt exhibiting a somewhat different design from the one shown in FIGS. 1 and 2.

In the FIGS. 1 and 2 a vehicle seat is indicated with 51. The sidewall of the vehicle is indicated with 52, and one of its side doors is indicated with 53. The safety belt illustrated is of such type that the active part of the band comprised by the assembly of the safety belt exhibits the shape of a Y, the one part 54 corresponding to the staple of the Y having one of its ends extending to a band roll 55 located downwards at the inside of the vehicle seat 51. The two additional band parts 56 and 57 at their extreme ends are fastened to the side door of the vehicle near to the rear edge thereof by means of an upper and a lower fastening fitting 58 and 59 respectively. The band roll 55 acts upon the band part 54 with a yielding force operating in the winding up direction. A fitting comprised by the assembly of the safety belt is indicated with 60 and through said fitting the respective band parts are thread preferably in such a way that they can run. From the fitting 60 a wire 61 is extending in a forwards direction, which wire at its forward end is wound up on the wire pulley 62 of a reversible electric motor 63. A fitting fastened to the sash of the door is indicated with 64, which fitting serves the purpose of transferring the pulling forces acting upon the fitting 59 to the door sash, and a corresponding fitting, which serves the purpose to transfer the corresponding pulling forces from the fitting 58 to the door sash is indicated with 65. The fitting 60 forms a deflection means for the bands entering into the assembly of the safety belt, the function of said fitting being evident from the FIGS. 1 and 2 with respect of the position of the safety belt indicated with broken lines. In the example of embodiment illustrated the driving motor 63 is placed in front of the door below the instrument board of the vehicle, but other locations can of course also be imagined within the scope of the invention. An elastic band one end of which is fastened to the low rear corner of the door of the vehicle is indicated with 66, said band at its other end supporting a loop 68, through which the wire 61 is threaded for travelling therethrough. The loop 68 thus forms a deflection means for the wire 61 and tends in applied, i.e. operative condition of the safety belt to keep the pulling wire close to the person in question and to the side of the vehicle. When the door 53 is opened the wire pulley 62 of the motor 63 is rotated in the direction of collection, i.e. the wire 61 is stretched, a prolongation of the elastic band 66 is taking place, which means that the wire 61 is straightened out before the band 64 is fed out from the roll 55, and the deflection fitting 60 is moved forwards to the position indicated with broken lines. When the direction of rotation of the wire pulley 62 is reversed a return movement of the fitting 60 takes place to the position indicated with whole lines, in which the safety belt is operative, whereafter the band 66 pulls over the loop 68 against the side of the vehicle, which means that the wire 61 returns to its starting position, in which it does not constitute any obstacle for the operation of the vehicle. The pulling force created by the roll 55 and acting upon the band part 54 shall suitably be greater than the pulling force, with which the band 66 acts upon the wire 61.

The example of the modification illustrated in FIG. 3 is similar to the embodiment in FIGS. 1 and 2 except that the loop 68, through which the wire 61 is threaded in such a way that it can travel, is fastened to a runner 69 instead of band 66, and runner 69 can be displaced along a guide rail 70 arranged on the door of the vehicle. A pulling spring is indicated with 71, which at one of its ends 72 is fastened to the front of the door of the vehicle, and which is connected with the runner 69 by means of a wire 73, which near to the rear end of the guide rail 70 is laid over an idling pulley 74. The function of this arrangement is in principle the same as the device described in connection with the FIGS. 1 and 2, and a more detailed description thereof therefore is not deemed necessary.

The invention is not limited to the safety belt described above and illustrated in the drawings by way of example only, as said safety belt can be varied as to its details within the scope of the following claims.

I claim:

1. Safety belt for vehicles comprising a vehicle having at least one seat, a side door positioned alongside said seat and structure in front of said seat, a Y-shaped-safety belt having one part and a second part, resilient means connected to and tending to pull said one part of said belt and connected to said vehicle on the inner side of said seat, said one and second parts of said belt being connected to upper and lower portions of said door, a fitting slideably mounted on said one part of said belt and connected to said belt second part, a reversible motor with pulley mounted on said vehicle structure, a wire being connected to said fitting and extending around said pulley, a loop having said wire threaded therethrough and resilient means being connected to said loop and said door tending to pull said loop towards said door.

2. Safety belt as claimed in claim 1 wherein said resilient means is an elastic band connected to said loop and the rear portion of said door.

3. Safety belt as claimed in claim 1 wherein said resilient means includes guiding means extending longitudinally of and on said door, a runner is slideably mounted in said guiding means and connected to said wire and a resilient member is connected to said door and said runner and positioned for pulling said runner towards the rear portion of said door.

4. Safety belt as claimed in claim 3 wherein said resilient member is a coil spring arranged on said door and having one end connected to said door, a pulley is rotatably mounted on said door and a second wire is connected to said spring and said runner and passes around said pulley.

* * * * *